US008569678B2

(12) United States Patent
Goldberg (10) Patent No.: US 8,569,678 B2
(45) Date of Patent: Oct. 29, 2013

(54) MICRON-SCALE LENS ARRAY HAVING DIFFRACTING STRUCTURES

(75) Inventor: Kenneth A. Goldberg, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 525 days.

(21) Appl. No.: 12/921,126

(22) PCT Filed: Mar. 4, 2009

(86) PCT No.: PCT/US2009/036062
§ 371 (c)(1),
(2), (4) Date: Oct. 22, 2010

(87) PCT Pub. No.: WO2009/111583
PCT Pub. Date: Sep. 11, 2009

(65) Prior Publication Data
US 2011/0284725 A1 Nov. 24, 2011

Related U.S. Application Data

(60) Provisional application No. 61/033,689, filed on Mar. 4, 2008.

(51) Int. Cl.
*H01J 3/14* (2006.01)
(52) U.S. Cl.
USPC ...................................... 250/216; 250/208.1
(58) Field of Classification Search
USPC ........ 250/216, 239, 208.1; 359/619–621, 456
See application file for complete search history.

(56) References Cited

U.S. PATENT DOCUMENTS

| 6,072,620 | A | 6/2000 | Shiono et al. |
| 6,236,508 | B1 | 5/2001 | Stapelbroek |
| 8,021,714 | B2 * | 9/2011 | Peterson ..................... 427/163.3 |
| 2006/0215054 | A1 * | 9/2006 | Liang et al. ................... 348/337 |
| 2008/0031497 | A1 | 2/2008 | Kishigami et al. |

OTHER PUBLICATIONS

Chen et al., "Using imprinting technology to fabricate three-dimensional devices from moulds of thermosetting polymer patterns", Semiconductor Science and Technology, vol. 21, pp. 1213-1220, (2006).
Fu et al., "Design of hybid micro-diffractive-refractive optical element with wide field of view for free space optical interconnections", Optics Express, vol. 10, No. 13, pp. 540-549, (Jul. 1, 2002).
Ottevaere et al., "Comparing glass and plastic refractive microlenses fabricated with different technologies", Journal of Optics A: Pure and Applied Optics, vol. 8, pp. S407-S429, (2006).

(Continued)

*Primary Examiner* — Que T Le
(74) *Attorney, Agent, or Firm* — Lawrence Berkeley National Laboratory (57) ABSTRACT

A novel micron-scale lens, a microlens, is engineered to concentrate light efficiently onto an area of interest, such as a small, light-sensitive detector element in an integrated electronic device. Existing microlens designs imitate the form of large-scale lenses and are less effective at small sizes. The microlenses described herein have been designed to accommodate diffraction effects, which dominate the behavior of light at small length scales. Thus a new class of light-concentrating optical elements with much higher relative performance has been created. Furthermore, the new designs are much easier to fabricate than previous designs.

14 Claims, 9 Drawing Sheets

(56) References Cited

OTHER PUBLICATIONS

Liu et al., "Analysis of microlens array with long focal depth and small f-number by improved first Rayleigh-Sommerfeld method", Journal of Optics A: Pure and Applied Optics, vol. 8, pp. 964-972, (2006).

Shiono et al., "Rectangular-apertured micro-Fresnel lens arrays fabricated by electron-beam lithography", Applied Optics, vol. 26, No. 3, pp. 587-591, (Feb. 1, 1987).

Southwell, "Focal-plane pixel-energy redistribution and concentration by use of microlens arrays", Applied Optics, vol. 33, No. 16, pp. 3460-3464, (Jun. 1, 1994).

Volkel et al., "On the chomatic aberration of microlenses", Optics Express, vol. 1, No. 11, pp. 4687-4694, (May 29, 2006).

Ye, "Improved first Rayleigh-Sommerfeld method for analysis of cylindrical microlenses with small f-numbers", Optics Letters, vol. 29, No. 20, pp. 2345-2347, (Oct. 15, 2004).

International Search Report and Written Opinion for International Application No. PCT/US2009/036062 mailed Jun. 9, 2009.

* cited by examiner

MICRON-SCALE LENS ARRAY HAVING DIFFRACTING STRUCTURES

RELATED APPLICATIONS

This application is the national phase application of International application number PCT/US2009/036062, filed Mar. 4, 2009, which claims priority to and the benefit of U.S. Provisional Application No. 61/033,689, filed on Mar. 4, 2008, which is hereby incorporated by reference in its entirety.

STATEMENT OF GOVERNMENTAL SUPPORT

This invention was made with government support under Contract No. DE-AC02-05CH11231 awarded by the U.S. Department of Energy. The government has certain rights in the invention.

BACKGROUND OF THE INVENTION

This invention relates generally to structures for concentrating light, and, more specifically, to arrays of microlenses for concentrating light onto a pixilated array.

There are numerous applications in digital imaging where millions of tiny light-collecting elements or microlenses are densely packed in a pixilated array. These arrays appear in imaging devices such as digital cameras, image scanners, and potentially in solar cells. The necessary presence of microelectronic devices and wires on the front surface of the detectors limits the area available for light-sensitive regions. When properly designed, microlenses situated on each element direct as much light as possible away from the insensitive regions and onto the photo-detector elements. The present invention rejects conventional wisdom and the state of the art concerning how these lenses should be shaped, and suggests shapes that are both easy to fabricate and can be significantly more energy efficient.

Figure 1A:
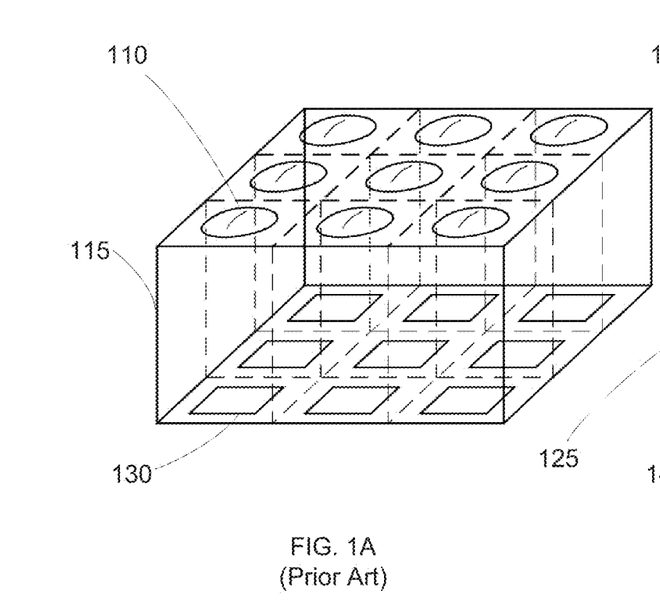
FIGS. 1A and 1B are schematic drawings of prior art microlens designs.
Figure 1B:
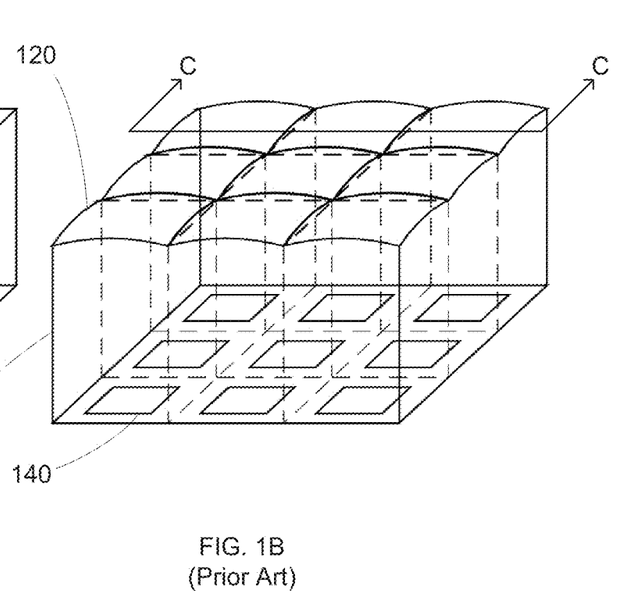

Prior art microlens designs imitate traditional large lenses in form and intended function, as shown in prior art FIGS. 1A and 1B. Such prior art microlens designs are based on plano-convex lenses formed from a solid block of transparent material sitting above an array of light-sensitive detector elements. The prior art design in FIG. 1A shows the microlenses positioned only above the detector elements. The prior art design in FIG. 1B shows the microlenses covering the entire available area with spherically-shaped segments in order to maximize the collection and concentration of light.

Figure 1C:
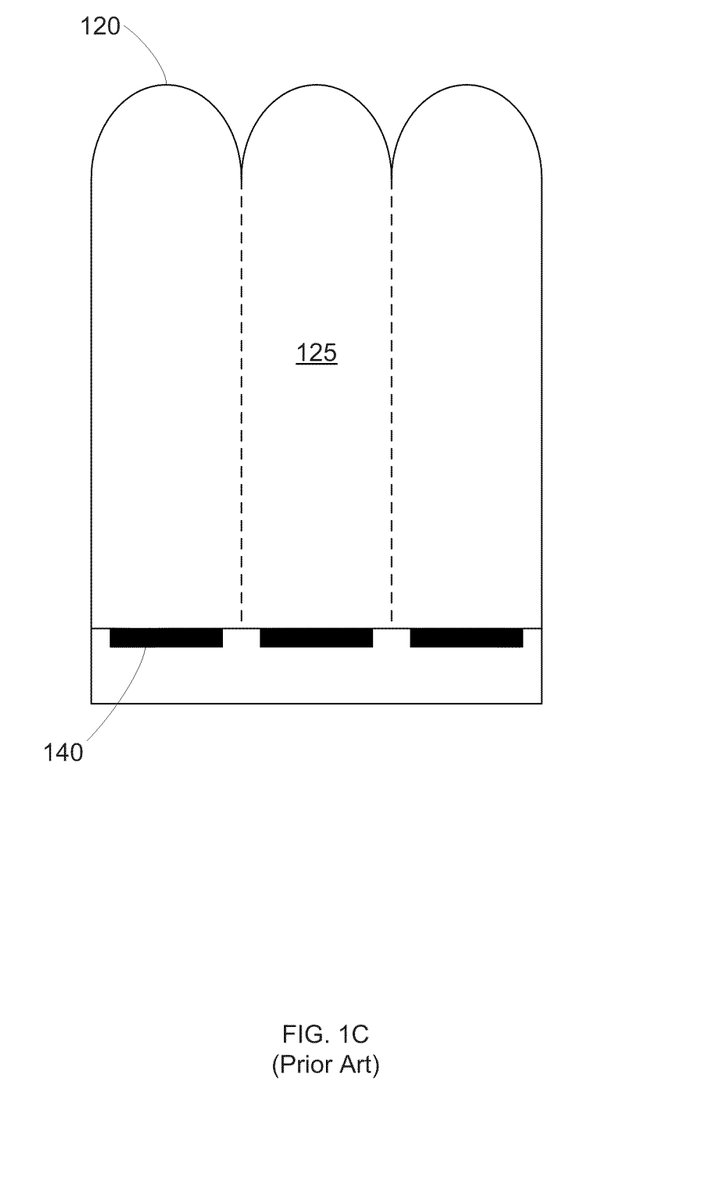
FIG. 1C is a cross-section cut of prior art FIG. 1B as viewed along the arrows C-C.

Such microlenses 110, 120 approximate plano-convex lenses with spherical-cap shapes formed at the surface of a thick, transparent material 115, 125 that fills the space above light-sensitive detector elements 130, 140. FIG. 1C is a cross-section cut of FIG. 1B as viewed along the arrows C-C. According to classical optics, where the index of refraction of the transparent material is n (>1), and the radius of the spherical cap is R, incident light from a faraway bright object is focused inside the thickness of the lens material, with a focal length f. Calculation off follows the so-called Lensmaker's Equation, which, in this simple case reduces to $$f=Rn/(n-1)$$

Since n is greater than 1, the focal length f will be greater than the R, and is usually several times R.

However, miniaturization complicates the physics of light focusing considerably. Where the sizes of the microlens elements reach the micron scale, the rules of classical "ray-tracing" no longer apply. The pixel sizes of interest (i.e., the array periods) are below 5 μm, and some designs may extend below 1.0 μm. The wavelengths of visible light span the range 0.4 to 0.7 μm, meaning that the microlens widths are on par with a single wavelength, and may be up to several wavelengths wide, at most. At this small size, the physics of light propagation is dominated by diffraction.

Figure 2:
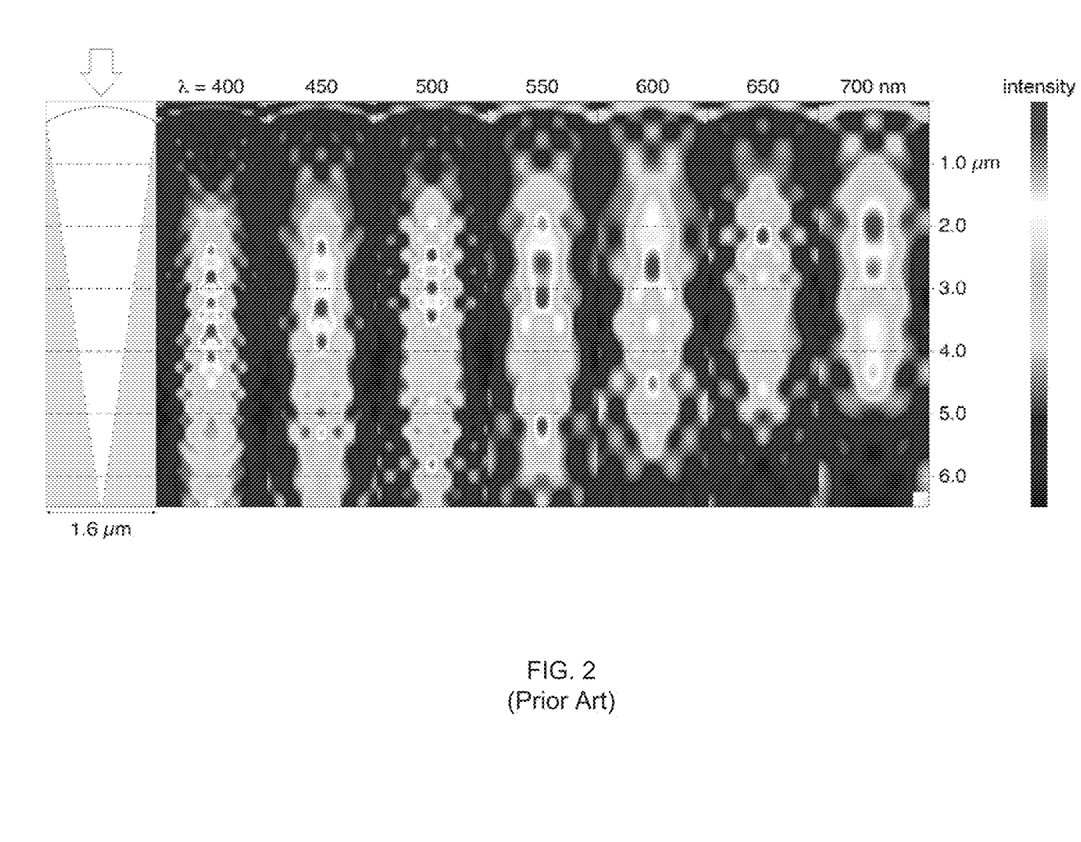
FIG. 2 is a numerical simulation of three-dimensional light focusing within an individual a prior art plano-convex spherical-cap microlens with an index of refraction n=1.3, and a lens radius, R=1.44 μm.

Detailed finite-difference time-domain (FDTD) numerical simulations have been used to model the vector electromagnetic field as the light propagates through microlens systems. As shown in prior art FIG. 2, the calculations show that the traditional hemispherical lens design is not optimized for concentrating light onto a detector. The microlens geometry is shown in the column at left, with light incident from above and a simplistic representation of light focusing shown in light gray. Calculations are made for a range of incident wavelengths from 400 to 700 nm, labeled at the top of each column. The grayscale images represent the light intensity in a plane that contains the apex of the microlens; each calculation is individually scaled, and the linear intensity scaling is shown at right. For the specific case shown (R=1.44, n=1.3), the focal length predicted by the Lensmaker's Equation is $$f=Rn/(n-1)=6.24\,\mu m,$$

independent of wavelength. The simulations show that the depth where the light concentration is greatest occurs significantly above the focal length predicted by the Lensmaker's Equation. Furthermore, there is a significant chromatic dependence, meaning that different wavelengths of light (i.e. different colors) are focused to different depths within the material. Therefore, designs based on classical ray-tracing considerations lead designers to place light-sensitive detectors in regions with relatively low light concentrations (i.e., power densities).

An additional consideration is cross-talk, or the tendency for light incident on one lens element to fall onto the detector element or elements belonging to adjacent pixels. The larger the longitudinal distance between the microlens and the detector, the higher the chance that the design will allow cross-talk to occur. Such considerations are excluded from the simple, ray-tracing model.

New light-focusing structures that take into account the physics of light propagation at this very small scale are clearly needed.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The aforementioned needs are satisfied by the embodiments of the present invention which provide specially designed diffractive optical elements that can focus light onto light detectors, such as the pixels of a charge coupled device (CCD) with higher efficiencies and much less cross talk than has been possible heretofore.

These and other objects and advantages of the present invention will become more fully apparent from the following description taken in conjunction with the accompanying drawings.

The embodiments of the invention are novel micron-scale lenses, "microlenses," engineered to concentrate light efficiently onto small, light-sensitive detector elements in an integrated electronic device. By designing these inventive microlenses to accommodate diffraction effects, which dominate the behavior of light at small length scales, a new class of light-concentrating optical elements with much higher relative performance has been created. Furthermore, the new designs offer fabrication benefits in overcoming difficulties associated with current designs.

The new designs described herein can be optimized empirically or analytically, and are freed from the unnecessary constraint that the lens shapes resemble classical lenses. In this manner the new elements may be called microlens-concentrators because their purpose differs from that of a classical lens.

The inventive designs place a three-dimensional structure of transparent material (microlens-concentrators) above light-sensitive detector elements in a manner similar to existing microlens-array designs. The inventive designs depart from existing designs where the shape of the lens is concerned. Here the microlens is not viewed strictly as a classical lens, but rather as a diffractive light-concentrating element, tailored to produce the greatest possible light power density onto the light-sensitive detector area. Furthermore, the longitudinal position (depth) of the detector elements are matched to the properties of the diffractive microlenses, minimizing cross-talk.

Figure 3:
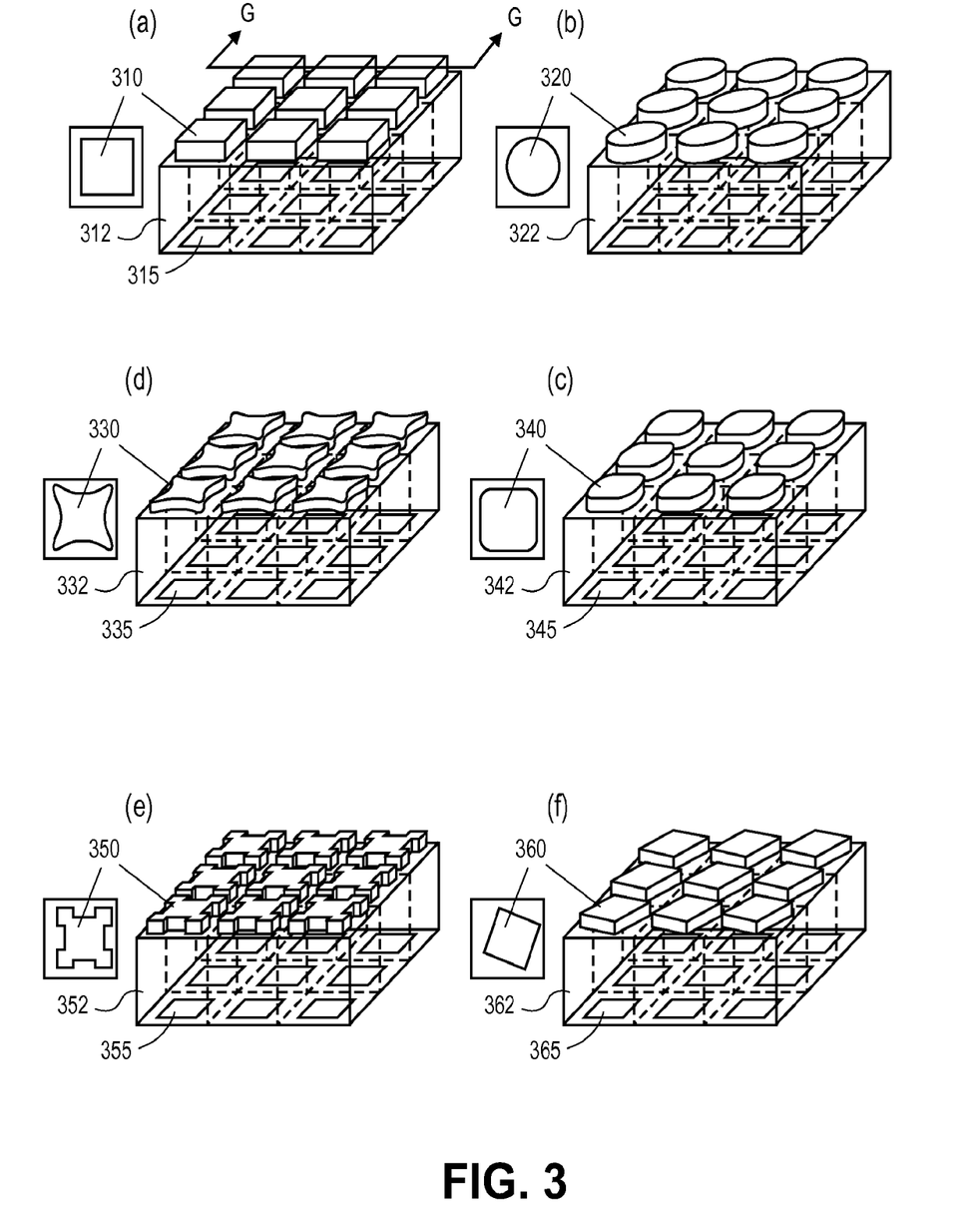
FIGS. 3a, 3b, 3c, 3d, 3e, and 3f shows schematic drawings of six microlens or microlens-concentrator designs of the present invention.
FIG. 3G is a cross-section cut of FIG. 3a as viewed along the arrows G-G.

In one embodiment of the invention, as shown in FIG. 3, transparent, diffracting microlens elements 310, 320, 330, 340, 350, 360 are positioned above detector elements 315, 325, 335, 345, 355, 365, respectively. Shown are (a) rectangular prisms, (b) cylindrical disks, (c) smoothed rectangular prisms, (d) rectangular prisms with corner serifs, (e) rectangular prisms with additional corner features, and (f) rectangular prisms rotated by an angle between 0 and 45 degrees. To the left of each design the top-view of a single microlens element is shown. Light propagating through each microlens element and through the intervening block of optical material has a tailored phase distribution designed to concentrate the light onto the corresponding detector element or pixel below. The 3×3 array segments shown can represent small portions of much larger arrays.

The microlens elements 310, 320, 330, 340, 350, 360 are on one surface of optically transparent blocks 312, 322, 332, 342, 352, 362, respectively. In an embodiment of the present invention, the opposite side of the optically transparent blocks 312, 322, 332, 342, 352, 362 are in contact with the detector elements 315, 325, 335, 345, 355, 365, respectively. In an embodiment of the present invention, there is an intervening layer(s) between the block and the detectors. In FIG. 3, each block 312, 322, 332, 342, 352, 362 has a constant height between the detectors and the microlenses. In one embodiment of the invention, the composition of each block 312, 322, 332, 342, 352, 362 is constant across the array. In another embodiment of the invention, the composition of the block 312, 322, 332, 342, 352, 362 is different over different pixels as desired.

The shapes and thicknesses of the diffracting elements are engineered for the highest possible light-concentration onto the detector areas, across a wavelength spectrum of interest. Problems associated with crosstalk can be minimized by reducing the distance between each microlens element and its corresponding detector. In one embodiment of the invention, the microlens diffracting elements are parallel-sided, and the horizontal cross section of the elements does not change from top to bottom, as shown in FIG. 3. The parallel-sided design is especially easy to fabricate using standard microfabrication techniques, for example, as have been developed for the semiconductor industry.

In other embodiments of the invention, the microlens-concentrator elements are not parallel-sided. Any design that can make use of the diffraction properties of light that dominate the physics of light propagation at the micron scale, as discussed above, can be used.

Figure 3G:
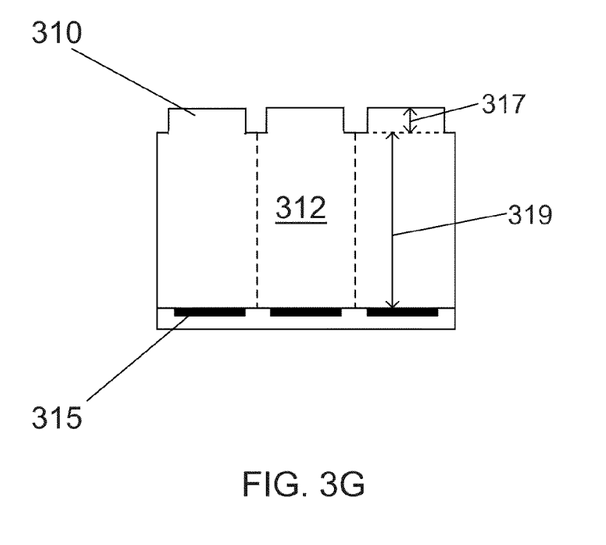

Consider the microlens-concentrator designs shown in FIG. 3. Six exemplary structures are shown: (a) rectangular prisms, (b) cylindrical disks, (c) smoothed rectangular prisms, (d) rectangular prisms with corner serifs, (e) rectangular prisms with additional corner features, and (f) rectangular prisms rotated by an angle between 0 and 45 degrees. A cross-sectional cut of FIG. 3a as viewed along the arrows G-G is shown in FIG. 3G. Light incident on the transparent structure of the microlens-concentrator undergoes a phase-change upon transmission relative to the light that propagates around the upward-projecting shape 310, 320, 330, 340, 350, 360. In this manner the phase and distribution of light passing through the microlens-concentrator can be tailored. A lens is intended to perform the same role, but at these small length scales, the designs of the present invention have been shown to perform better. On feature that distinguishes the present invention from traditional lens design is the uniform cross-section of the inventive structures.

Different lens designs may be made for different detector element widths. It is useful to tailor the design of the microlens-concentrator for the particular light detecting device and conditions with which it will be used. It is believed that the optimal designs will share the four-fold symmetry of the periodic array. However, a rotated design, such as the rotated rectangular prism 360 shown in FIG. 3f, may be useful under some circumstances as well. When cross-talk is a major concern, it may be that the rotation causes diffracted light to fall in a less problematic direction, such as in between neighboring detector elements rather than onto a neighboring detector element itself.

Figure 4:
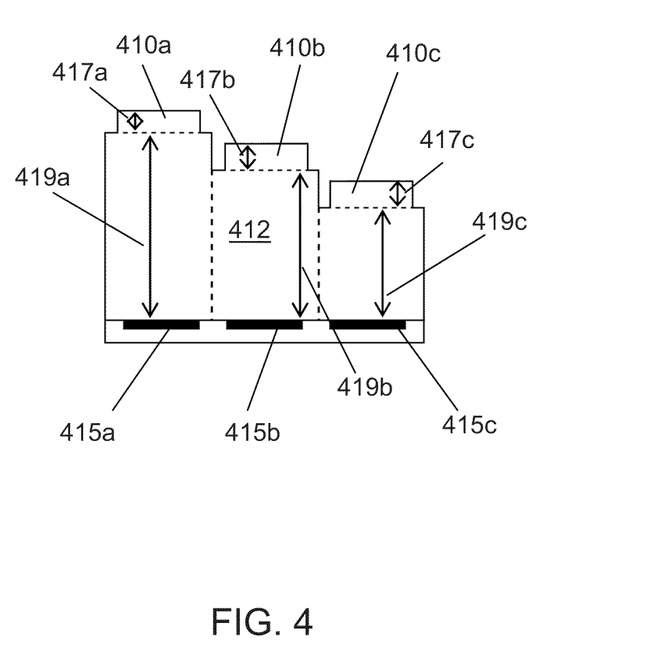
FIG. 4 is a cross section view of a microlens array with corresponding detector elements according to another embodiment of the invention.

In another embodiment of the invention, FIG. 4 is a cross-sectional view of a portion of a microlens array 410a, 410b, 410c, with corresponding detector elements 415a, 415b, 415c, respectively. The microlens elements 410a, 410b, 410c are on one surface of optically transparent block 412. The opposite side of the optically transparent block 412 is in contact with the detector elements 415a, 415b, 415c. In one arrangement, there can be intervening layer(s) between the block 412 and the detectors 415a, 415b, 415c. In FIG. 4, for each microlens element 415a, 415b, 415c there is a different block height 419a, 419b, 419c between the microlens and its corresponding detector element 415a, 415b, 415c, respectively. This may be done to optimize the light concentration properties for specific light wavelengths hitting each detector element. This arrangement can be useful when the detector elements have been customized for particular different wavelengths, e.g., if the detector elements have been designed to each respond to one of the three primary colors. The thicknesses 417a, 417b, 417c of the microlens-concentrators 410a, 410b, 410c may or may not all be the same. FIG. 4 shows the detector elements as coplanar and the positions of the microlens-concentrators as changing with the variation in height of the block. In another arrangement, the microlens-concentrators are coplanar and the positions of the detector elements change with the variation in height of the block.

The constant cross-section design simplifies the microlens fabrication process considerably because the same lithographic technologies that are used to fabricate the detector elements and circuitry can be used to make the microlens diffracting elements as well. In this way the severe problems associated with alignment of microlens-arrays over detector elements are solved.

Diffracting microlens concentrator arrays can be lithographically fabricated using modern micro-fabrication techniques. Such techniques include optical, ultraviolet, or deep-ultraviolet lithography, which are used in the mass production of semiconductor electronics. The microlens arrays may also be fabricated using electron-beam lithography, or nano-imprint lithography; the latter technique allows continuously contoured shapes to be produced at low cost. Designs that include layered elements of constant cross section can be easier to fabricate using the non-imprint lithographic technologies, which include patterned etching and controlled growth.

Figure 5:
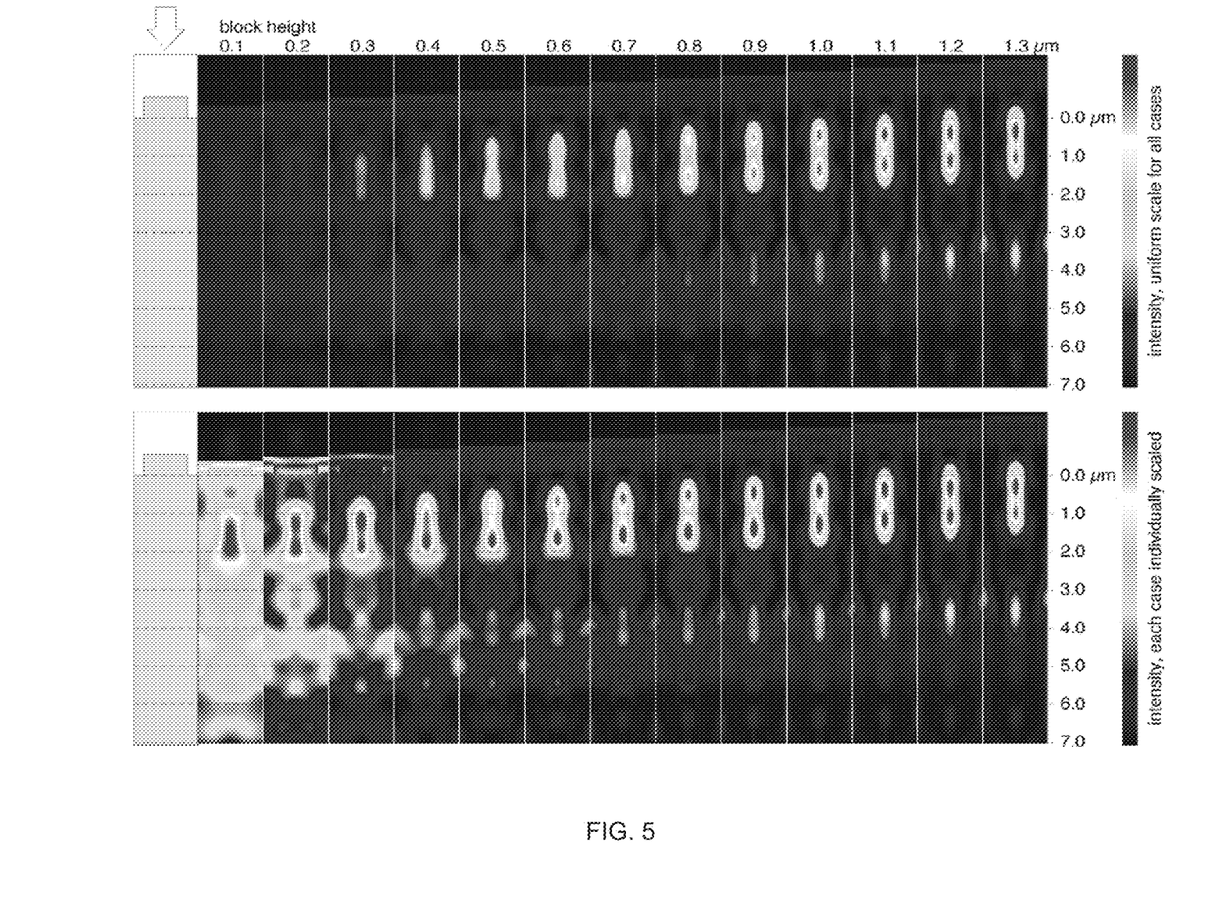
FIG. 5 shows electric-field intensity cross-section calculations for rectangular-prism or microlens-concentrator designs of varying block heights (meaning the thicknesses of the block between the microlens-concentrator and the detector) and a single incident light wavelength of 550 nm.

FIG. 5 shows light-propagation calculations as made for the rectangular-prism microlens-concentrator design 310 in FIGS. 3a and 3G with a square cross section and block heights varying from 0.1 to 1.3 µm, in 0.1-µm steps, and 550-nm wavelength incident light. The cross-sectional area of the rectangular-prism is one-half of the detector element area. The calculations are shown scaled two different ways: (above) on a single intensity scale for all cases, and (below) the images are individually scaled for the individual maximum intensity value in each case. In the 1.3-µm block-height case, at the position of peak intensity, approximately 1 µm below the bottom of the block, and centered, the intensity exceeds 12 times the incident intensity. Placing the detector at this relatively shallow position will minimize the potential for cross-talk between adjacent detector elements, relative to the spherical designs.

Figure 6:
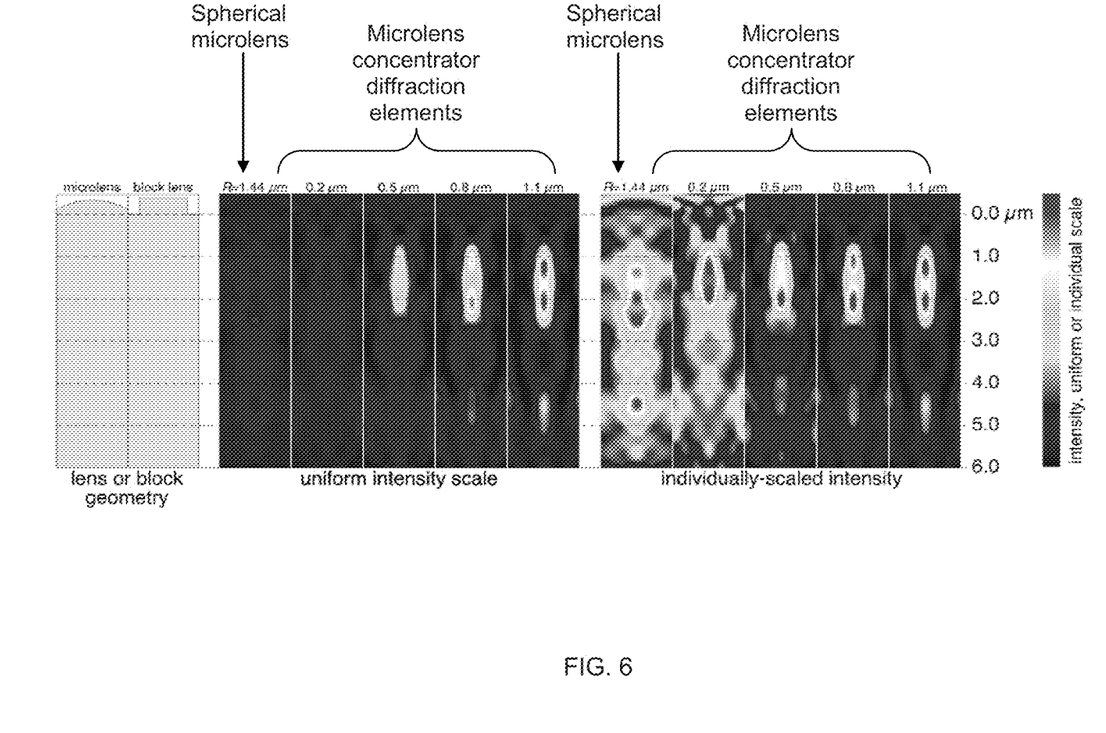
FIG. 6 shows electric-field intensity cross-section calculations for spherical microlens and rectangular diffracting element designs.

FIG. 6 shows a side-by-side comparison of a prior art spherical microlens 120 in FIG. 1B and the microlens-concentrator design 310 seen in FIGS. 3a and 3G. The individual diffracting element heights are given above each simulation case. The cross-sectional geometry is shown at left. Relative to the input field intensity (1.0), the peak intensities within the block below the diffracting elements are (left to right) 2.89 (spherical), 2.84 (0.2-µm block), 7.32 (0.5 µm), 10.38 (0.8 µm), and 11.85 (1.1 µm). The detector element width is 1.6 µm, and the wavelength is 550 nm. Two intensity scales are shown: (left) a single, uniform scaling for direct comparison, and (right) individual scales. A spherical microlens with radius R=1.44 µm is shown in the left column of each set. The rectangular-prism structure heights are shown above each simulation. For cases with different structure heights, the simulations are aligned with the tops of the blocks in the same vertical position. The comparison shows that the rectangular designs provide a much higher concentration of light: as high as 12 times the incident intensity at a shallower depth than expected, compared with only about 3 times for the prior art spherical microlens design.

The microlens-concentrator designs can be optimized based on a performance metric that assesses the light-concentrating efficiency of the device across a wavelength spectrum of interest. In order to optimize the designs of the present invention, first it would be useful to know the range of wavelengths of interest so that the light detector device would be useful over this range. It would also be useful to know the optical properties of the transparent material to be used to make the microlens-concentrators: properties such as index of refraction and absorption depth. Among the structured-transparent-block designs described herein, there are two parameters that have particular impact on device performance: the thickness of the microlens-concentrator structure (shown as 317 in FIG. 3G) and the height of the block (shown as 319 in FIG. 3G). Optimization can be performed empirically by studying the light concentrating properties of each design across the wavelength range of interest. In each case, the light detector depth is an additional parameter to consider. As the detector 315 is adjacent to the side of the block opposite the microlens-concentrators 310, the depth of the light detector 315 is set essentially by the height of the block 319. In the non-circular, and non-rectangular designs, the size and shape of the serifs, the radius of the smoothed edges, and the azimuthal rotation angle can also be parameters in the design.

Design optimization can also proceed through analytic techniques. Using an analytic near-field light-propagation method, the design of the transparent block structure can be optimized with a multi-parameter non-linear solution algorithm.

Figure 7:
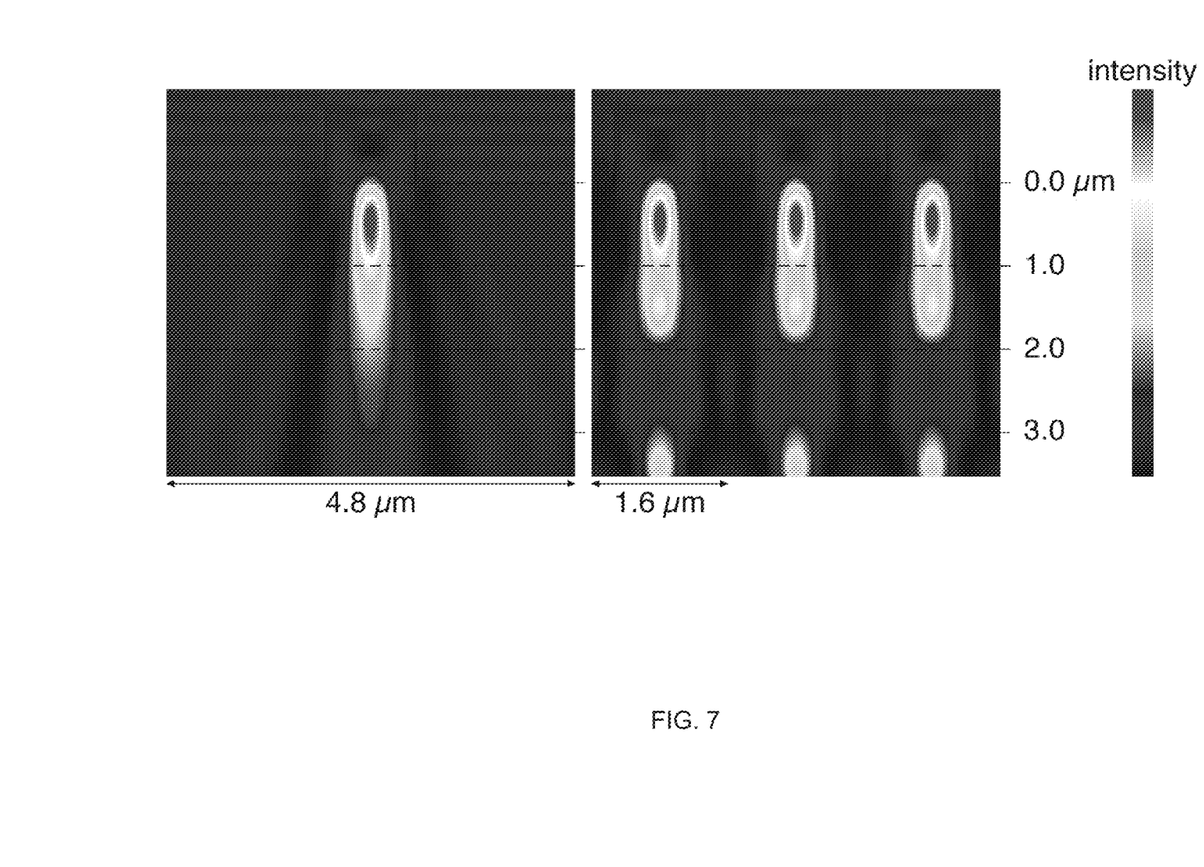
FIG. 7 shows numerical simulations of cross-talk behavior for (left) isolated and (right) dense microlens concentrators.

The strength and significance of cross-talk has been studied by comparing the behavior of isolated versus dense microlens arrays. In the dense-array calculations, it is virtually impossible to assess what fraction of the power incident on a given detector originated from the microlens directly above it. By studying an isolated microlens, the lateral power distribution can be investigated. FIG. 7 shows a side-by-side comparison of calculated intensity cross-sections made through a widely-spaced array (4.8-µm spacing) and a dense array (1.6 µm), for a microlens concentrator design with a cylindrical top structure, according to an embodiment of the invention. The transparent structure is a cylinder, 0.917 µm tall, providing approximately 180° phase shift relative to the light flowing around the cylinder with an index of refraction n=1.3. For the purposes of calculation, the case referred to here as "isolated" is actually pseudo-isolated: the spacing between adjacent microlenses in the calculation is generous, with a 4.8 µm period. This spacing is much greater than the "dense" 1.6 µm spacing that would place the microlens elements side-by-side, abutting. The intensities are plotted on the same linear scale. The peak intensity reaches 10.9 times the input intensity in both cases.

The subtle differences between the isolated and the dense microlens cases, shown in FIG. 7, reveals that a given microlens diffracts some power into the adjacent detector element's space and influences the power distribution. This demonstration of cross-talk behavior reveals why it is important to place the light-sensitive detector as close to the diffracting structure as possible.

The microlens-concentrator diffracting elements as described herein can find application in digital cameras, image scanners, or medical imaging devices, where light images are collected in pixilated form. There may also be applications in solar cell designs where the microlenses increase the collection efficiency of the solar cells. Operating in reverse, with a small light-emitting device buried below the structured transparent element, the microlens concentrators may harness the radiated light and emit it with a tailored angular profile.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A microlens array, comprising:
   a block of transparent material, the block having a first planar surface; and
   a plurality of diffracting structures disposed on the first planar surface of the block, each diffracting structure of the plurality of diffracting structures having a first surface and a second surface, the first and the second surfaces being substantially parallel to one another and being substantially parallel to the first planar surface of the block.

2. The microlens array of claim 1, wherein each diffracting structure of the plurality of diffracting structures has a thickness between about 0.1 and 2.0 wavelengths of light to be focused by the microlens array.

3. The microlens array of claim 1, wherein the transparent material is selected from the group consisting of a thermoplastic polymer, a curable liquid resist, a plastic, and a glass.

4. The microlens array of claim 1, wherein each diffracting structure of the plurality of diffracting structures has a shape selected from the group consisting of a rectangular prism, a cylindrical disk, a smoothed rectangular prism, a rectangular prism with corner serifs, and a rectangular prism with additional corner features.

5. A light detector array, comprising:
   a block of transparent material, the block having a first planar surface and a second planar surface, the first and second planar surfaces being essentially parallel and separated by a distance;
   a plurality of diffracting structures disposed on the first planar surface of the block, each diffracting structure of the plurality of diffracting structures having a first surface and a second surface, the first and the second surfaces being substantially parallel to one another and being substantially parallel to the first planar surface of the block; and
   a light detector pixel array adjacent the second planar surface of the block.

6. A microlens array, comprising:
   a block of transparent material, the block having a first planar surface, a second planar surface, and a third planar surface, the first and third planar surfaces being essentially parallel and separated by a first fixed distance, the second and third planar surfaces being essentially parallel and separated by a second fixed distance;
   a first diffracting structure disposed on the first planar surface of the block; and
   a second diffracting structure disposed on the second planar surface of the block.

7. The light detector array of claim 5, wherein each diffracting structure of the plurality of diffracting structures has a thickness between about 0.1 and 2.0 wavelengths of light to be focused.

8. The light detector array of claim 5, wherein the transparent material is selected from the group consisting of a thermoplastic polymer, a curable liquid resist, a plastic, and a glass.

9. The light detector array of claim 5, wherein each diffracting structure of the plurality of diffracting structures has a shape selected from the group consisting of a rectangular prism, a cylindrical disk, a smoothed rectangular prism, a rectangular prism with corner serifs, and a rectangular prism with additional corner features.

10. The microlens array of claim 6, wherein the first and the second diffracting structures include a first surface and a second surface, the first and the second surfaces being substantially parallel to one another and being substantially parallel to the third planar surface of the block.

11. The microlens array of claim 6, wherein the first and the second diffracting structures have a thickness between about 0.1 and 2.0 wavelengths of the light to be focused by the microlens array.

12. The microlens array of claim 6, wherein the transparent material is selected from the group consisting of a thermoplastic polymer, a curable liquid resist, a plastic, and a glass.

13. The microlens array of claim 6, wherein the first and the second diffracting structures have a shape selected from the group consisting of a rectangular prism, a cylindrical disk, a smoothed rectangular prism, a rectangular prism with corner serifs, and a rectangular prism with additional corner features.

14. The microlens array of claim 6, further comprising:
   a first light detector pixel array adjacent the third planar surface of the block, wherein the first light detector pixel array is positioned so that the first diffracting structure is operable to focus light thereupon; and
   a second light detector pixel array adjacent the third planar surface of the block, wherein the second light detector pixel array is positioned so that the second diffracting structure is operable to focus light thereupon.

* * * * *